Figure 1:
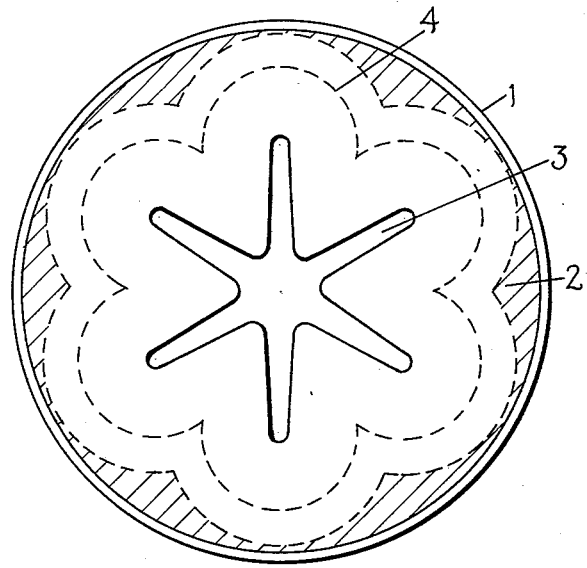

United States Patent Office 3,002,459
Patented Oct. 3, 1961

3,002,459
PROPELLANT CHARGES
Aubrey Edward Harper, Shawlands, Glasgow, Scotland, assignor to Imperial Chemical Industries Limited, London, England, a corporation of Great Britain
Filed Oct. 4, 1956, Ser. No. 613,990
Claims priority, application Great Britain Nov. 9, 1955
5 Claims. (Cl. 102—98)

This invention relates to improvements in or relating to propellant charges and more particularly to perforated propellant charges as used in rocket devices and the like.

Perforated propellant charges of the aforesaid kind for example of the type having a star-shaped perforation have on burning various disadvantages. Thus for a charge having a star-shaped perforation and consisting of a single propellant and which is prevented from burning on all surfaces except the faces of the star-shaped perforation the burning surface will progressively change in contour but the burning area will remain approximately constant until the contour degenerates to a sliver consisting of a series of cusps touching the periphery of the charge after which burning will take place on a continuously decreasing area with consequent decrease in the pressure of the gas evolved. The portion of charge burning under reducing pressure conditions may amount to 10% or more of the complete charge. This aforementioned decrease in pressure causes a decrease in efficiency and hence for some purposes charges have to be used which are larger than convenient. The proportion of sliver may be reduced by increasing the number of star points but this is accompanied by reduction in mechanical strength of the charge and complication of configuration leading to manufacturing difficulties. The perforated design is however particularly useful for example in rocket applications where lightweight construction of the charge chamber is essential because the containing vessel walls can be kept cool since there is no burning on the periphery of the charge. It is therefore desirable for many applications to have a propellant charge of perforated design the gases from which having attained their maximum pressure will continue to be produced at that pressure until the propellant is completely consumed.

According to the present invention a propellant charge comprises at least two concentric portions of propellant composition of substantially the same physical and thermo-chemical properties in cohesive union, wherein the end surfaces and the external surface of the propellant charge are protected from burning, wherein each concentric portion has a slower rate of burning than its adjacent inner concentric portion, wherein the configuration of each concentric portion is such that at any instant of time when the propellant charge is burning the sum of the products of the area exposed for each concentric portion and the rate of burning for that concentric portion is such as to give a total rate of evolution of gas which is required for any desired pressure-time relationship, as for instance, a substantially constant pressure-time relationship, and wherein the burning reaches all points on the periphery of the charge at substantially the same instant of time.

If desired at least one of said concentric portions can consist of separate parts.

In accordance with one embodiment of the invention each concentric portion has an axial star-shaped bore, wherein each bore with the exception of the bore in the innermost concentric portion has an adjacent inner concentric portion having an external configuration which permits it to be in said cohesive union with its adjacent outer concentric portion, wherein the axial star-shaped bore on any inner concentric portion is preferably so positioned that any one of its external points lies substantially on the same radius as at least one internal point of the star-shaped bore of its adjacent external concentric portion, and wherein the outermost concentric portion has preferably a continuous cylindrical external surface.

In a preferred form of said embodiment of the invention the propellant charge consists of two concentric portions of propellant composition in which charge the inner portion has a transverse cross-section in the shape of a six-pointed star the points of which lie at the periphery of the charge on radii which pass midway between the points of the star of its axial star-shaped bore and in which charge the outer propellent composition has a continuous cylindrical surface and wherein the ratio of the burning speed of the outer slower burning propellent composition to the burning speed of the inner faster burning composition is such that the time taken to burn to the periphery is the same on all radii. It is also preferred in this form of said embodiment that the angle included by the two sides forming each external star point of the transverse cross-section of the inner propellent composition should be 80°.

For most purposes it is preferred for the charges of the invention to consist of only two concentric portions of propellent composition.

The configuration of the portions of the propellent compositions can be obtained by geometrical construction taking into consideration the initial shape of the perforation and the relative burning speeds of the portions. It is such a geometrical analysis based on these factors which is employed to determine whether any particular shape which can be given to the portions of a charge will permit a charge to be constructed having the desired characteristics.

Said concentric portions of propellent composition may consist of any gas-producing composition which is used for producing gases under pressure and may be for instance cast or pressed propellent compositions. Suitable pressed propellent compositions include for example mixtures consisting of guanidine nitrate, ammonitum nitrate, potassium nitrate, and a catalyst for the thermal decomposition of the guanidine nitrate and ammonium nitrate. These mixtures may include for example a wax. Cast propellent compositions can consist for example of mixtures containing nitrocellulose, nitroglycerine and a non-explosive plasticiser.

Furthermore for those charges of the invention which are required to have on burning a constant pressure-time relationship the decrease in the burning surface of a faster burning portion of propellent composition is accompanied by an increase in the burning surface of the slower burning portion of propellent composition contiguous thereto and the rates of increase and decrease are inversely proportional to the burning speeds of these two portions. Thus in such a charge consisting of two portions of propellent composition the necessary conditions are satisfied if the burning rates of the two propellent compositions are in the ratio 1.25 to 1 and the area of the exposed surface of the star-shaped bore of the inner portion to that of the outer surface is in the ratio of 1 to 1.25. In this charge burning will take place initially only in the faster burning portion of propellent composition in the customary manner of a hitherto available charge having a star perforation with the contour of the perforation assuming a cusp-shaped form until the boundary between the fast and slow burning portions of propellent composition is reached after which the contour of the perforation will gradually approach a circular form. It has been ascertained that a charge according to the invention and consisting of two portions of propellent composition will leave only a small sliver equivalent to about 0.5% of the charge weight at the end of burning whereas a charge consisting of a single propellant composition having a star-shaped perforation or bore as previously available may leave a sliver of about 10% of the total weight.

Figure 2:
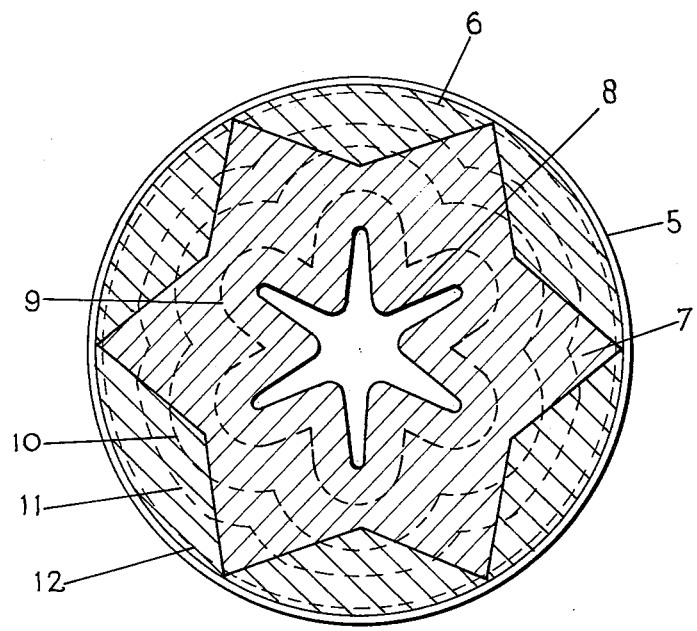
Figure 3:
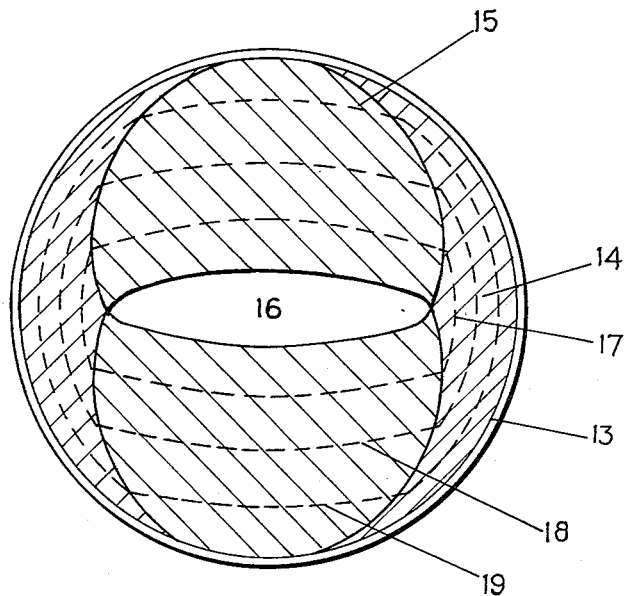

In the diagrammatic drawing accompanying the specification FIGURE 1 illustrates a conventional star perforated charge and FIGURE 2 illustrates one embodiment of the invention consisting of two concentric portions of propellent composition. FIG. 3 illustrates another embodiment of the invention. In FIGURE 1, 1 is the charge casing, 2 is the sliver remaining after burning, 3 is the charge perforation and 4 represents an intermediate burning position. In FIGURE 2 the casing 5 contains the charge of the invention consisting of the portion 6 of the slower burning propellent composition and the portion 7 of the faster burning propellent composition. This portion 7 has a star perforation 8. 9, 10, 11 and 12 show intermediate burning positions which can be obtained by geometrical construction as aforementioned.

In the hitherto available star-shaped perforated charges the perforation has substantially the same area as the burning surface at the moment of formation of the individual cusps, whereas in the charges of the invention the area of the perforation is considerably decreased. This is an important advance since it allows a greater charge to be used in a reaction chamber of the same volume and since the minimum web thickness of the charge, i.e. the distance from the periphery to the star points of the perforation, will be greater, increased mechanical strength is achieved.

The aforesaid embodiment of the invention is illustrated by the following example.

*Example*

A charge consisting of two portions similar to that illustrated in FIGURE 2 of the diagrammatic drawing is made by pressing at 10,000 lb./sq. in. two powder compositions into an inert container of internal diameter 16.4 inches and length 19.5 inches and which is provided with removable formers to permit the desired shapes of the two portions and of the protective layer to the external surface of the charge to be obtained. These compositions after their consolidation have burning speeds 0.152 inch/sec. and 0.121 inch/sec. at 465 lb./sq. in. absolute. The composition which has a burning speed of 0.152 inch/sec. forms the inner portion and the composition of burning speed 0.121 inch/sec. forms the outer portion of the charge. The ratio of the faster burning speed to the slower burning speed is 0.152:0.121=1.25.

The fast and slow portions of the charge consist of the following propellent compositions wherein parts are parts by weight.

| | Fast burning portion | Slow burning portion |
|---|---|---|
| Guanidine nitrate | 62.0 | 62.0 |
| Ammonium nitrate | 32.5 | 32.5 |
| Potassium nitrate | 3.5 | 3.5 |
| Ammonium dichromate | 2.0 | 2.0 |
| Cupric oxalate | 0.2 | |
| China clay | 0.4 | 0.5 |

The external surface of the charge and its two end surfaces are protected by consolidating on these surfaces under the aforesaid pressure an inert composition consisting of a mixture of guanidine nitrate 75 parts and china clay 25 parts in an amount to give a protective layer of thickness 0.2 inch.

The maximum thickness of the slow burning propellent composition is 2.6 inches and the maximum thickness of the rapid burning propellent composition is 6.8 inches while the minimum thickness of the rapid burning propellent composition is 1.7 inches. The width of the star perforation at its external points is 0.5 inch and the re-entrant angle between the plane boundaries between two adjacent external points of the perforation is 285.5°.

In order to compare the burning characteristics of the aforesaid charge of the invention with the burning characteristics of a similarly shaped and protected charge consisting of a single propellent the burning time $t_b$ and the action time $t_a$ are obtained for both of these charges in the following manner in accordance with usual practice by examining the pressure-time curves for these charges.

A pressure-time curve normally consists of a rapidly rising portion, a substantially horizontal portion and a decreasing portion.

The burning time $t_b$ is defined as the period between the time when the pressure has risen 10% of its maximum value and the time when the pressure begins to drop sharply near the end, which latter time is found by drawing tangents to a substantially horizontal portion and to the decreasing portion at its point of inflexion and bisecting that angle between these two tangents by a line which will cut the pressure-time curve nearer to the horizontal portion and determining the time at the point on the curve where it is thus cut by this line.

The action time $t_a$ is defined as the period between the time when the pressure has risen to 10% of its maximum value and the time when the pressure has fallen to 10% of the value it has at $t_b$ as hereinbefore defined.

In practice, however, the rise of pressure is normally so rapid that the beginning of the periods of time $t_a$ and $t_b$ can be taken to be the time of the commencement of the rise in pressure.

The sliver of a charge is contributary to the falling portion of a pressure-time curve and the falling in pressure is responsible for reducing the efficiency of the charge. Thus the inefficiency of the charge due to the falling pressure can be held to be given by the ratio $t_a:t_b$.

The aforesaid charge of the invention has a burning time $t_b$ of 33.5 seconds and an action time $t_a$ of 36.5 seconds, giving a ratio $t_a:t_b=1.09$.

The aforesaid similarly shaped and protected charge of a single propellant gives $t_b=34$ seconds and $t_a=51$ seconds, giving a ratio $t_a:t_b=1.5$. Thus with the single propellant charge the period over which the gas pressure is falling and which is thus a period of decreasing efficiency is 0.5 of the burning time $t_b$ whereas in the aforesaid two-propellant charge of the invention this period is only 0.09 of the burning time.

In the diagrammatic drawing attached hereto FIGURE 3 illustrates another embodiment of the invention wherein the casing 13 contains the charge of the invention consisting of portion 14 of the slower burning propellent composition and the portion 15 of the faster burning propellent composition. This portion has an elliptical perforation 16 wherein the major axis is 0.633 of the diameter of the charge and the minor axis is 0.142 of the diameter of the charge. The ratio of the burning speeds is 2.34. 17, 18 and 19 are intermediate burning portions of the charge which are obtained by geometrical construction as aforementioned and indicate that no sliver is obtained.

What I claim is:

1. A cylindrical propellant charge for jet propulsion, the end surfaces and external surface of which are protected from burning, comprising at least two concentric portions of propellant composition of substatially the same physical and thermo-chemical properties in cohesive union with different burning rates, wherein the outermost concentric portion has a continuous cylindrical external surface, wherein each of said concentric portions has an axial star-shaped bore, the said axial star-shaped bore on any inner concentric portion being so positioned that any one of its external points lies substantially on the same radius as at least one internal point of the star-shaped bore of its adjacent external concentric portion, and wherein each bore with the exception of the bore in the innermost concentric portion has an adjacent inner concentric portion having an external configuration which permits it to be in said cohesive union with its adjacent outer concentric portion.

2. A propellant charge as claimed in claim 1 wherein the innermost concentric portion has a transverse cross-section in the shape of a six-pointed star the points of which lie at the periphery of the charge on radii which pass midway between the points of the star of its axial star-shaped bore, and wherein the ratio of the burning speed of the outer slower burning propellant composition to the burning speed of the inner faster burning composition is such that the time taken to burn to the periphery is the same on all radii.

3. A propellant charge as claimed in claim 2 wherein the angle included by the two sides forming each external star point of the transverse cross-section of the inner propellant composition is 80°.

4. A propellant charge as claimed in claim 1 wherein said concentric portions of propellant composition consist of cast propellant compositions.

5. A propellant charge as claimed in claim 1 wherein said concentric portions of propellant composition consist of pressed propellant compositions.

References Cited in the file of this patent

UNITED STATES PATENTS

| 1,074,809 | Newton | Oct. 7, 1913 |
| 2,762,193 | Johnson | Sept. 11, 1956 |

FOREIGN PATENTS

| 2,554 | Great Britain | of 1877 |

OTHER REFERENCES

Jet Propulsion, vol. 26, No. 2, pages 102–105, February 1956.

Jet Propulsion, pages 757–759, September 1956.